United States Patent
Wang et al.

(10) Patent No.: US 6,889,212 B1
(45) Date of Patent: May 3, 2005

(54) METHOD FOR ENFORCING A TIME LIMITED SOFTWARE LICENSE IN A MOBILE COMMUNICATION DEVICE

(75) Inventors: Alex C. Wang, Plantation, FL (US); Wai Alan Chan, Miramar, FL (US); Jy-Han Lin, Coral Springs, FL (US); Robert L. Geiger, Redwood City, CA (US); Ronald R. Smith, Coral Springs, FL (US); Sanjay Wanchoo, Lauderhill, FL (US)

(73) Assignee: Motorola, Inc., Schaumburg, IL (US)

( * ) Notice: Subject to any disclaimer, the term of this patent is extended or adjusted under 35 U.S.C. 154(b) by 647 days.

(21) Appl. No.: 09/613,798

(22) Filed: Jul. 11, 2000

(51) Int. Cl.[7] .............................................. G06F 17/60
(52) U.S. Cl. ............................ 705/59; 705/1; 370/259; 370/263; 379/93.03; 379/102.02; 379/102.03; 379/106.06; 455/405; 455/406; 455/418; 713/150
(58) Field of Search .................... 705/59, 1; 370/259, 370/263; 379/93.03, 102.02, 102.03, 106.06; 455/405, 406, 418; 713/150

(56) References Cited

U.S. PATENT DOCUMENTS

| | | | |
|---|---|---|---|
| 5,444,780 A | 8/1995 | Hartman, Jr. ................ 380/30 |
| 5,500,897 A | 3/1996 | Hartman, Jr. ................ 380/25 |
| 5,771,347 A | * 6/1998 | Grantz et al. ................ 713/200 |
| 6,460,140 B1 | * 10/2002 | Schoch et al. .............. 713/200 |
| 6,525,995 B1 | * 2/2003 | Diehl et al. ................... 368/47 |
| 6,560,651 B2 | * 5/2003 | Katz et al. ................... 709/229 |

FOREIGN PATENT DOCUMENTS

JP          401196627 A   *   1/1998   .......... G06F/12/00

OTHER PUBLICATIONS

Simple Network Time Protocol Version 4, D. Mills, Oct. 1996.*

* cited by examiner

Primary Examiner—James P. Trammell
Assistant Examiner—John Winter
(74) Attorney, Agent, or Firm—Scott M. Garrett

(57) ABSTRACT

A mobile communication device (104) loads an application bundle (200), which includes a software application (202) and an indication of a time limited license (206). To enforce the time limited license, the mobile communication device, upon attempting to invoke the application code (310), obtains a secure time reading (312). It is contemplated that a secure time server (116) may be used to facilitate license enforcement. Once the secure time reading is obtained, the mobile communication device compares the time with the license period, and executes the code only if the time reading is within the license period.

8 Claims, 3 Drawing Sheets

100

METHOD FOR ENFORCING A TIME LIMITED SOFTWARE LICENSE IN A MOBILE COMMUNICATION DEVICE

TECHNICAL FIELD

This invention relates in general to software license enforcement, and more particularly to enforcing license periods of software for use on a mobile communication device.

BACKGROUND OF THE INVENTION

Software licenses dictate the permissible uses of the corresponding software. The license may include a limitation of time, so that the software is useable only for a period of time, such as with so called "demo" licenses. This allows a developer to let potential customers see how the software performs so as to make a decision about purchasing a full version of the software, or a license that is not time restricted. Time based licenses can also be used with subscription software, where the user of the software pays periodically to keep the license valid so as to continue using the software.

A problem arises, however, with most computer or client devices that are used to execute and run the software because it is a simple task to reset the clock of the machine, or set it back so as to extend the period of time the software may be used. This is possible because, in their simplest form, the software simply checks the machine's clock when it is installed, and simply notes the time from the machine's clock every time it is invoked. If the prescribed period of time has elapsed, according to the clock, the software quits and ceases execution. More sophisticated license enforcement schemes include keeping track of the total time the software is active, and disallowing any further execution once a cumulative time period has been reached. However, this method can be overcome fairly easily as well.

Therefore there is a need for a method for enforcing a time limited software license. This is particularly true with less sophisticated machines, such as personal organizers and mobile communication devices such as cellular radiotelephones. Mobile communication devices have gained widespread popularity, and many are presently being offered with the ability to browse media content on the Internet, as well as to obtain software over the Internet. However, few have reliable means of tracking the date and time, and are largely dependent on the user correctly entering the time and date. Therefore there is a need for a method for enforcing a time limited software license in mobile communication devices.

DETAILED DESCRIPTION OF A PREFERRED EMBODIMENT

Figure 1:
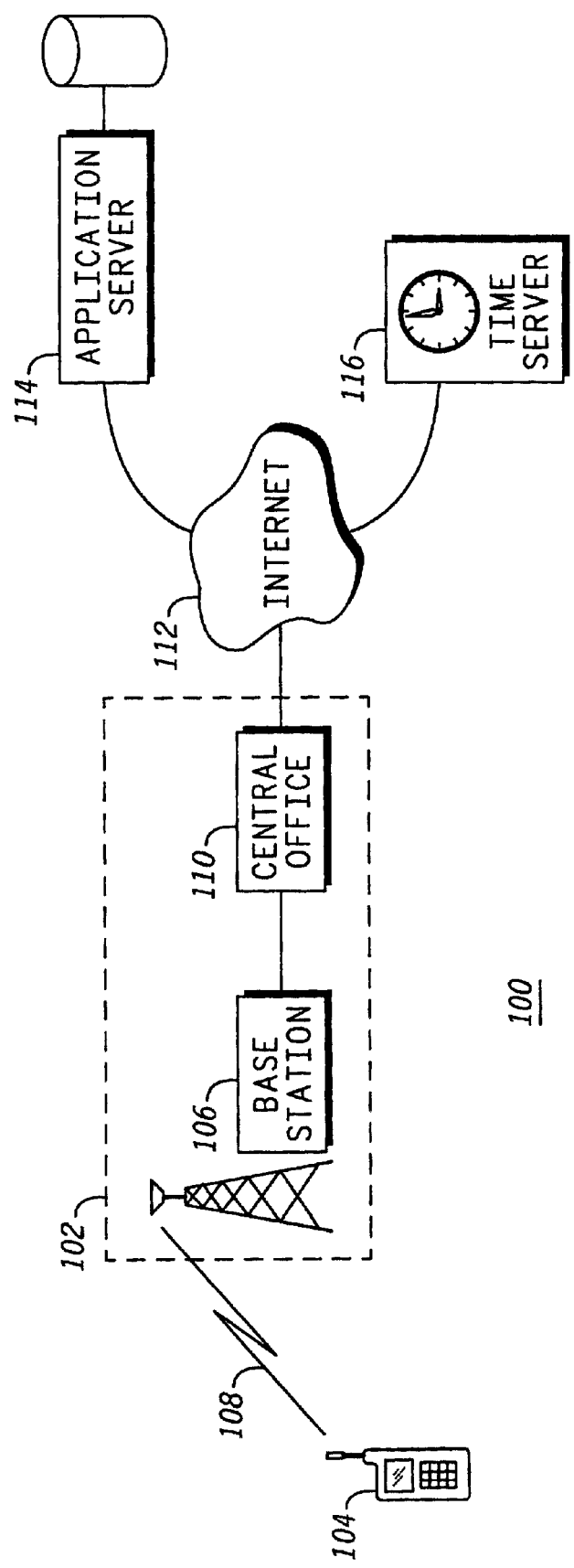
FIG. 1 shows a block diagram of a mobile communication system including a mobile communication device to be used in enforcing a time limited software license in accordance with the invention.

While the specification concludes with claims defining the features of the invention that are regarded as novel, it is believed that the invention will be better understood from a consideration of the following description in conjunction with the drawing figures, in which like reference numerals are carried forward. A brief description of the prior art is also thought to be useful.

The invention solves the problem of enforcing time limited software licenses in mobile communication devices by use of a trusted time source, in conjunction with bundling the software application code with cryptographic certificates and digital signatures. The certificates include at least a license certificate indicating the license period for which the user of the mobile communication device may use the application software. There are several ways in which a trusted or secure time reading may be obtained, but it is preferred that a secure time server be provided, and accessible over a network connection to the Internet. A trusted time server allows proper cryptographic authentication.

Referring now to FIG. 1, there is shown a block diagram 100 of a mobile communication system 102 including a mobile communication device 104 to be used in enforcing a time limited software license in accordance with the invention. The mobile communication system includes a base station 106 for establishing a serving cell in the vicinity of the base station. Mobile communication devices communicate over an air interface 108 which prescribes radio frequencies, slot timing, control signals, and so on, as is known in the art. Generally there will be a large plurality of serving cells so that mobile communication devices can move over a large geographic area and be able to communicate. The base station is connected to a central office 110, which includes various communication processing agents such as mobile switching centers for providing connectivity to public switched telephone networks. In the preferred embodiment the central office also includes a gateway to provide connectivity to the Internet 112. Presently, mobile communication devices are available with a "microbrowser" for viewing media content served over the Internet, and special, non-voice channels for packet data are made available in the air interface of the mobile communication system. Using such a microbrowser it is possible to download software, including, for example, JAVA code, and install it on the mobile communication device where it may be executed. For example, a developer of software for mobile communication devices can make their software available on an application server 114, which is connected to, and accessible over the Internet. To assist in enforcing the time limited license, it is preferred that a secure, trusted time server 116 be provided, also connected to, and accessible over the Internet. However, it is contemplated that alternative means of provided secure time readings may be utilized, such as, for example, broadcasting the present time over a control channel of the air interface of the communication system.

Figure 2:
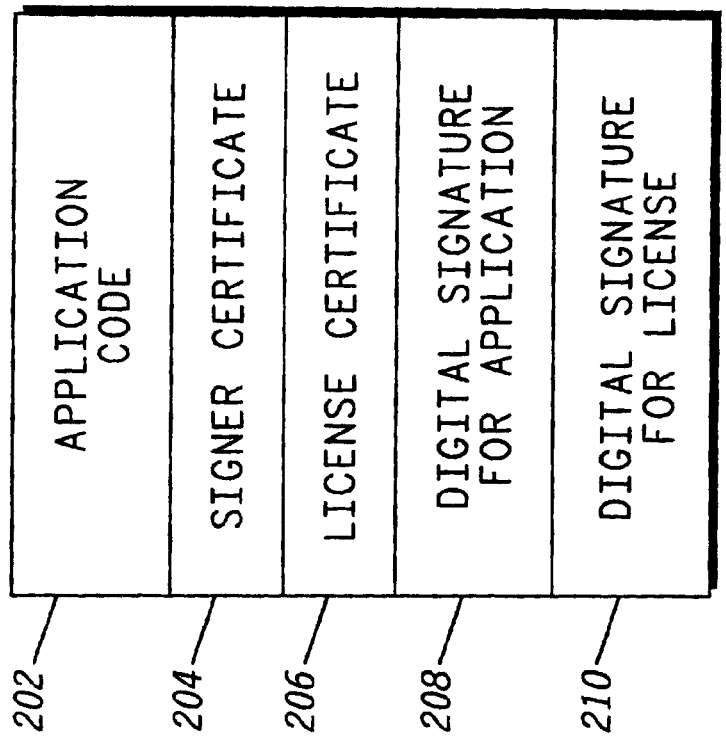
FIG. 2 shows a block diagram of an application bundle for use in enforcing a time limited software license in accordance with the invention.

Referring now to FIG. 2, there is shown a block diagram of an application bundle 200 for use in enforcing a time limited software license in accordance with the invention. The application bundle is provided by the developer on, for example, an application server, as shown in FIG. 1. Of course, it may be provided on other media as well. The application bundle includes software application code 202, which is code that is executable by the mobile communication device. It may be, for example, byte code of a JAVA applet or application. It is contemplated that the application bundle may be provided as part of a JAVA archive (JAR) file. The application bundle is so named because, bundled with the software application code, are files used for cryptographically authenticating the software application code, and prescribing the license policy of the software application code. In the preferred embodiment, there is included a signer certificate 204, a license certificate 206, a digital signature for the application 208, and a digital signature for the license 210. The signer certificate is a conventional digital certificate. A digital certificate is an electronic means of identifying an entity that establishes a parties credentials when doing business or other transactions on over the Internet. It is issued by a certification or certificate authority. It contains the name of the party holding or issuing the certificate, a serial number, expiration dates, a copy of the certificate holder's public key (used for encrypting and decrypting messages and digital signatures), and the digital signature of the certificate-issuing authority so that a recipient can verify that the certificate is real. Some digital certificates conform to a standard, X.509. Digital certificates can be kept in registries so that authenticated users can look up other users' public keys The license certificate 206 contains the license policy, including the license period. It may be created upon request for the application bundle, so that the license period starts when the application bundle is transmitted to, or otherwise loaded onto the mobile communication device. It is provided in certificate form so that it may be authenticated. To further assist in the authentication of the application there may be included digital signatures for the application and the license. Digital signatures are based on asymmetric, or public key, cryptography. In addition to a key pair and some type of electronic communications, the digital signing and verification processes involve something known as a hash algorithm and a signature algorithm. The hash and signature algorithms are extremely complex mathematical equations. The hash algorithm is performed on the original electronic message's binary code, resulting in what is referred to as a message digest, which is, for example, a 160-bit string of digits that is unique to the original message. The signature algorithm is then performed on this message digest. The resultant string of digits is the digital signature. The signer's private key is incorporated into the signature algorithm during the signing process, and the public key is incorporated into the signature algorithm during the verification process.

Figure 3:
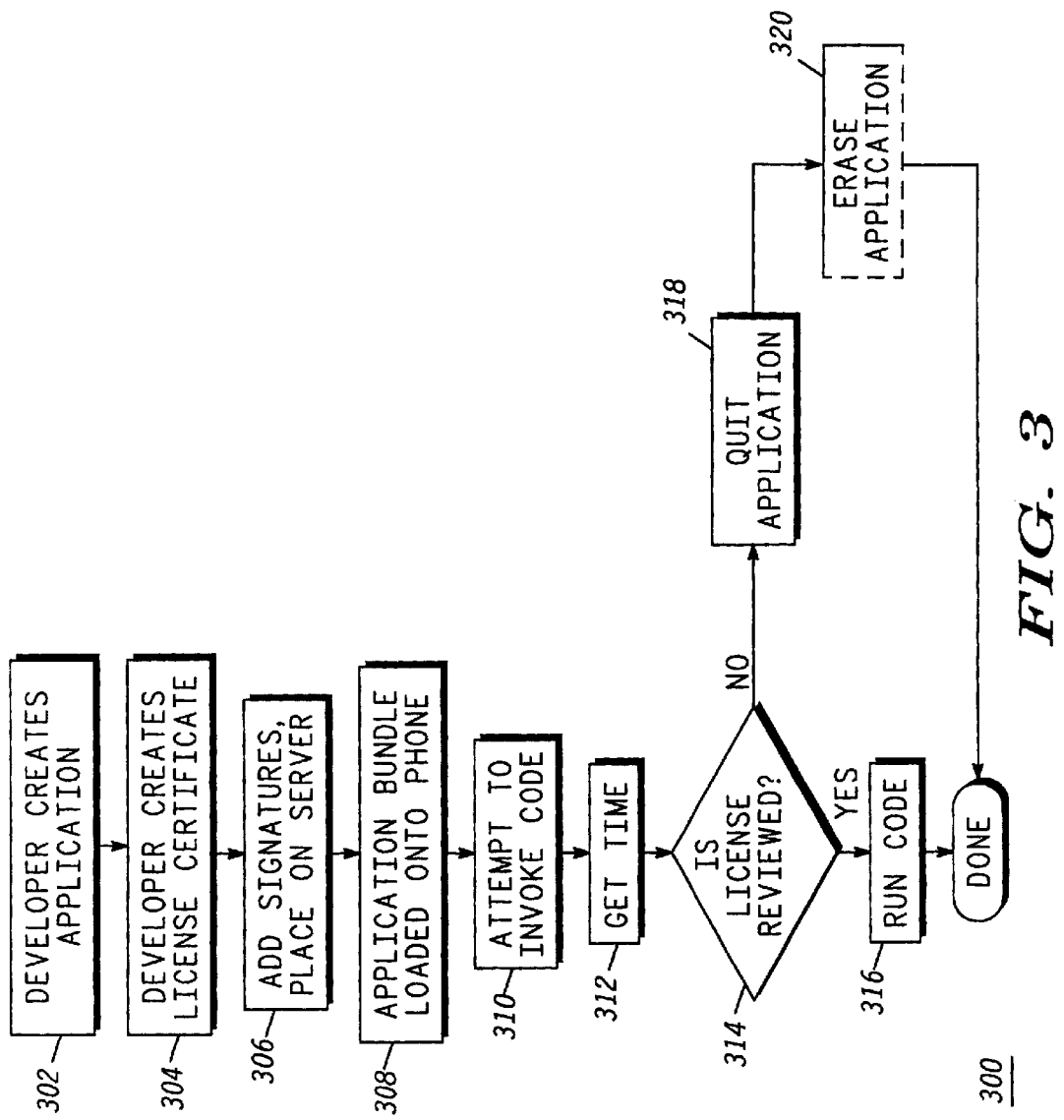
FIG. 3 shows a flow chart diagram of a method of enforcing a time limited software license in a mobile communication device, accordance with the invention.

Referring now to FIG. 3, there is shown a flow chart diagram 300 of a method of enforcing a time limited software license in a mobile communication device, in accordance with the invention. In one embodiment of the invention, the method includes providing the software application code in the mobile communication device, meaning that the application code is somehow transferred to the mobile communication device, and is stored in a computer memory of the mobile communication device. The mobile communication device then about attempting to invoke the software application code for execution. Upon attempting to invoke the software application code, the mobile communication device goes about obtaining a secure time reading over the air interface of the communication system with which the mobile communication device is affiliated. Once the secure time reading is obtained the mobile communication device goes about comparing the secure time reading with the license period of the software application code. The secure time reading may include the time of day, date, year, and so on. The mobile communication device begins executing the software application code only if the secure time reading is within the license period of the software application code.

In the preferred embodiment, a developer creates the application (302). It may be in a portable format, such as JAVA, or it may be device specific. The developer then determines the license policy for the application (304). The developer than adds the digital signatures (306) for the application and the license, if desired. At this point the application bundle is ready to be used with the mobile communication device. It may be made available via an application server so that the mobile communication device can download it directly, or it may be downloaded to a personal computer, and then loaded onto the mobile communication device over a cable, or distributed on standard software media, for example. Regardless of the form it is provided, the bundle is loaded onto the mobile communication device (308). The mobile communication device may perform some security authentication before installing the code into a non-volatile memory, simply to verify that the code is authorized to access certain resources and code libraries to ensure proper operation. Once the code properly installed, the user of the mobile communication device will at some time decide to run the code. The mobile communication device will, in response, attempt to invoke the code (310). The mobile communication device will obtain a secure time reading (312). This can be done cryptographically by requesting a secure time reading from a secure time server, for example. Once the secure time reading is obtained, the mobile communication device compares the secure time reading with the license period of the software application code (314). If the secure time reading is within the license period, the mobile communication device begins executing the code (316). If the secure time reading is not within the license period, the mobile communication device quits the application code, and may disable or erase the application code (320). It is also contemplated that if the license period has expired, the mobile communication device may attempt to load an updated version of the application code by querying the application server to determine if an update is available.

Several alternatives to the method are contemplated, such as obtaining the secure time reading a broadcast control channel of the communication system's air interface. It would be somewhat difficult to reproduce this so as to avoid having the application code rendered inoperable. If the secure time server is used, the mobile communication device must know the network address of the time server. It is contemplated that the communication system may provide the network address of the secure time server over the air interface of the communication system. Alternatively, the network address of the secure time server may be provided in the license certificate associated with the software application code.

In an alternative embodiment, the method of enforcing the time limited software license includes loading the application bundle into the mobile communication device from the application server, authenticating the license certificate, installing the application bundle into a non-volatile memory of the mobile communication device, attempting to invoke the software application code for execution by the mobile communication device, upon performing executing the software application code, obtaining a secure time reading from a secure time server, comparing the secure time reading with a license period of the software application code, the license period indicated by the license certificate, and executing the software application code only if the secure time reading is within the license period of the software application code. The alternatives described above also may be used. The loading may include loading a signer certificate, a digital signature for the software application code, and a digital signature for the license certificate with the application bundle. It is further contemplated that the application server may bundle the components of the application bundle at the time of the request so as to provide a current license certificate.

Therefore, the present invention avoids the problems of easily defeating time limited license enforcement by bundling certain cryptographic features with the application code to assist in authenticating the code, and for enforcing the license. The time maybe provided in a secure manner, such as by a secure time server, or in the air interface of the communication system because the air interface is difficult and expensive to reproduce for the purpose of defeating the license enforcement activity. If the secure time reading is not within the license period, the mobile communication device declines to execute the code.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of enforcing a time limited software license of a software application code in a mobile communication device, wherein the software application code is bundled with a license certificate, thereby creating an application bundle, the application bundle located on an application server, the method of enforcing comprising:

loading the application bundle into the mobile communication device from the application server;

authenticating the license certificate;

installing the application bundle into a non-volatile memory of the mobile communication device;

attempting to invoke the software application code for execution by the mobile communication device;

upon performing executing the software application code, obtaining a secure time reading from a secure time server;

comparing the secure time reading with a license period of the software application code, the license period indicated by the license certificate; and executing the software application code only if the secure time reading is within the license period of the software application code;

wherein the loading, authenticating, and obtaining are performed by the mobile communication device by establishing a network connection over an air interface of a communication system with which the mobile communication device is affiliated.

2. A method of enforcing a time limited software license of a software application code in a mobile communication device as defined by claim 1, wherein the loading includes loading a signer certificate, a digital signature for the software application code, and a digital signature for the license certificate with the application bundle.

3. A method of enforcing a time limited software license of a software application code in a mobile communication device as defined by claim 1, further comprising disabling the software application code if the secure time reading is not within the license period.

4. A method for enforcing a time limited software license in a mobile communication device, comprising:

providing a software application code in the mobile communication device;

attempting to invoke the software application code for execution by the mobile communication device, wherein the obtaining the secure time reading is performed by the mobile communication device establishing a network connection with a secure time server;

providing a network address of the secure time server in a license certificate associated with the software application code upon performing attempting to invoke the software application code, obtaining a secure time reading over an air interface of a communication system with which the mobile communication device is affiliated; and comparing the secure time reading with a license period of the software application code;

executing the software application code only if the secure time reading is within the license period of the software application code.

5. A method of enforcing a time limited software license as defined in claim 4, wherein the obtaining the secure time reading is performed by reading a broadcast control channel of the communication system.

6. A method of enforcing a time limited software license as defined in claim 4, where in the obtaining the secure time reading is performed by the mobile communications device establishing a network connection with a secure time server is performed by connecting to the secure time server over the Internet through a gateway of the communication system.

7. A method of enforcing a time limited software license as defined in claim 4, further comprising providing a network address of the secure time server over the air interface of the communication system.

8. A method of enforcing a time limited software license as defined in claim 4, further comprising disabling the software application code if the secure time reading is not within the license period.

* * * * *